3,459,779
PROCESS FOR THE PRODUCTION OF
ALKYLTIN TRIHALIDES
Wilhelm Paul Neumann, Giessen (Lahn), Germany, assignor to Studiengesellschaft Kohle m.b.H., a corporation of Germany
No Drawing. Continuation-in-part of application Ser. No. 331,097, Dec. 17, 1963. This application June 7, 1967, Ser. No. 644,103
Claims priority, application Germany, Dec. 18, 1962, St 20,095
Int. Cl. C07f 7/22
U.S. Cl. 260—429.7      10 Claims

ABSTRACT OF THE DISCLOSURE

A process is disclosed for preparing alkyltin trihalides by comproportionation of dialkyltin dihalides, trialkyltin halides, tetraalkyltin and tin tetrahalides in the presence of polar substances, which in particular increase the polarity of the reaction medium, such as phosphorus oxychloride or other phosphorus-halogen compounds, preferably in admixture with phosphorus pentoxide, hydrochloric acid and the like, which are not irreversibly reacted with the reactants and reaction products.

This application is a continuation-in-part of application Ser. No. 331,097, filed Dec. 17, 1963, now abandoned.

This invention relates to a process for the production of alkyltin trihalides.

It is known that organotin trihalides of the formula $RSnX_3$ in which X may for example represent chlorine of the aromatic and the vinyl series (that is in which R for example is $C_6H_5$ or $CH_2=CH$, respectively), can be produced by comproportionation reaction of the corresponding tetraalkyltin with tin tetrahalide in an exploitable manner according to Equation 1:

$$R_4Sn + 3SnX_4 \rightarrow 4RSnX_3 \qquad (1)$$

However, the reaction cannot be employed for obtaining the important alkyltin trihalides having simple aliphatic radicals (in which R is, for example, ethyl, butyl, isobutyl or octyl). All prior known experiments in this respect have been completely unsuccessful or have only yielded the required product after complicated working up the yields at most amounting to 15% of the theoretical and then not in a high state of purity. A practical process for the production of these comopunds by this method has not so far been found. Rather it was necessary to be satisfied with the following partial comproportionation reactions:

$$R_4Sn + SnX_4 \rightarrow R_3SnX + RSnX_3 \qquad (2)$$

$$R_4Sn + 2SnX_4 \rightarrow R_2SnX_2 + 2RSnX_3 \qquad (3)$$

(R=aliphatic radical, X=Cl, Br, I).

The required alkyltin trihalide has therefore always previously been formed in association with another alkyltin halide which was not required and from which it had to be separated in additional operations. It is true that it may be possible occasionally to exploit the accompanying product but this is often possible.

Systematic investigations have proved that the reaction $$R_2SnX_2 + SnX_4 \rightarrow 2RSnX_3 \qquad (4)$$

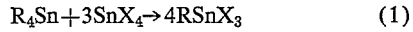

is one stage of the empirical reaction according to Equation 1. When R represents an aliphatic radical such as for example ethyl, butyl, isobutyl or octyl this stage does not proceed at finite speed and thus does not give an appreciable yield. Thus, the reaction according to Equation 1 is prevented.

It has now been found that it is still possible to obtain alkyltin trihalides according to Equation 4 and with good yields if catalysts are used. According to the invention alkyltin trihalides are obtained by comproportionation of dialkyltin dihalides, trialkyltin halides, or of tetraalkyltin and tin tetrahalides in the presence of polar substances, which in particular increase the polarity of the reaction medium, such as phosphorus oxychloride or other phosphorus-halogen compounds, preferably in admixture with phosphorus pentoxide, hydrochloric acid and the like, which are not irreversibly reacted with the reactants and reaction products.

Thus in the comproportionation of tetraalkyltin, and for the purpose of optimum yields, it is for example possible for the total quantity of the reactants, if desired with an excess tin tetrahalide, to be reacted with the catalyst in one stage to $RSnX_3$. However, it is also possible first of all to carry out in known manner a partial comproportionation in accordance with Equation 2 or 3, and then to produce the complete reaction of the reactants to alkyltin trihalide in a second stage by the process according to the invention.

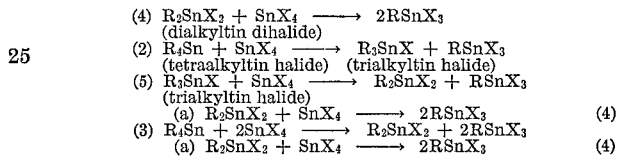

In the case of dialkyltin halide the organotin trihalide is directly formed (Equation 4) while in the case of the tetraalkyltin and trialkyltin halide the dialkyltin halide is first formed and is reacted with further tin tetrahalide to form the organotin trihalide.

With the process according to the invention, it is sufficient if there is available that quantity of tin tetrahalide which is stoichiometrically necessary according to Equation 4. It may, however, be advantageous to use an excess. The use of pressure is not necessary, but it has a favorable effect if it is desired to raise the temperature to above the boiling point of the reaction mixture for the purpose of shortening the reaction time. Solvents or diluents are generally not required, but they have no harmful effect.

The reaction products according to the invention, i.e., the alkyltin trihalides, are suitable starting materials, for the production of trifunctional organotin compounds and for obtaining tin-containing polymers.

In order that the invention may be more fully understood, the following examples are given, by way of illustration only:

EXAMPLE 1

A mixture of 24.8 g. (0.1 mol) of $(C_2H_5)_2SnCl_2$, 104 g. (0.4 mol) of $SnCl_4$, 46 g. (0.3 mol) of $POCl_3$ and 15.6 g. (0.11 mol) of $P_2O_5$ was heated to 120–130° C. After 24 hours, 83.3% and after 42 hours, 93.5% of the theoretical of $C_2H_5SnCl_3$ can be shown by analysis by gas chromatography of small specimens. Excess $SnCl_4$ and the $POCl_3$ were jointly driven off and the desired $C_2H_5SnCl_3$ is fractionated from the residue. Yield 47.2 g.=92.7% of the theoretical. Boiling point: 76–78°/12 mm. Hg, purity >99.5% (determined by gas chromatography). The residue and all first runnings were used again for a fresh batch. If the addition of $POCl_3$ was omitted, then a yield of 66% of the theoretical was obtained after a reaction time of 150 hours.

EXAMPLE 2

The procedure described in Example 1 was followed, but the addition of $P_2O_5$ was omitted. The yields were then usually somewhat lower. Unreacted $(C_2H_5)_2SnCl_2$ remained in the residue on the subsequent distillation and can be used again together with all first runnings.

EXAMPLE 3

26 g. (0.1 mol) of $SnCl_4$ were used, but in other respects the procedure was as indicated in Example 1. The reaction then proceeded more slowly, but the product and yield were comparable to that indicated above.

EXAMPLE 4

173.6 g. (0.5 mol) of tin tetra-n-butyl were introduced dropwise in known manner at 100° C. into 260.5 g. (1.0 mol) of $SnCl_4$, the temperature was kept for another 2 hours at 100° C. and the $C_4H_9SnCl_3$ which formed was distilled off (B.P. 45°/0.1 mm. Hg). Yield: 265.5 g. with 62.6% of the tin introduced. To the residue was added another 260.5 g. (1.0 mol) of $SnCl_4$, and also 230.0 g. (1.5 mol) of $POCl_3$ and 142 g. (1.0 mol) of $P_2O_5$, and the mixture was boiled under reflux. After fractionation, there were obtained another 261.5 g. of $C_4H_9SnCl_3$, so that the total yield amounted to 517 g.=92% of theoretical (found 38.7% Cl and 41.9% Sn). The remaining constituents of the reaction mixture could be used for another batch.

EXAMPLE 5

A similar result was obtained by replacing the n-butyl derivative by the same quantity of $(iso-C_4H_9)_4Sn$ and by working in the first reaction step for 30 minutes at 200° C. Total yield of $iso-C_4H_9SnCl_3$: 480 g.=85.5% of the theoretical. (Boiling point 35° C./0.25 mm. Hg).

EXAMPLE 6

42 g. of $(C_8H_{17})_2SnCl_2$ and 52 g. of $SnCl_4$ were treated in a manner analogous to that indicated in Example 1 and 61 g.=90% of the theoretical of $C_8H_{17}SnCl_3$ were obtained.

EXAMPLE 7

24.7 g. of $(C_2H_5)_2SnCl_2$, 78 g. of $SnCl_4$ and 30 cc. of 12 N-hydrochloric acid were heated to 120–130° C. After 24 hours, 45% of the theoretical of $C_2H_5SnCl_3$ could be found in a sample. It was better to use a suitable pressure-tight vessel at 140–150° C. After 24 hours the substance was worked up and 44.7 g.=88% of the theoretical of $C_2H_5SnCl_3$ were obtained. The remaining constituents of the reaction mixture could be used for a fresh batch.

EXAMPLE 8

A mixture of 30 g. of $(CH_3)_2SnBr_2$, 84 g. of $SnBr_4$, 15.6 g. of $P_2O_5$ and 82 g. of $POBr_2$ was treated in a manner analogous to that indicated in Example 1 and 65.5 g.=91% of the theoretical of $CH_3SnBr_3$ were separated out.

EXAMPLE 9

142.9 g. (0.5 mol) triethyltin bromide were added to 438.3 g. (1 mol) $SnBr_4$, 75 g. $P_2O_5$ and 400 g. $POBr_3$. The further processing was carried out as set out in Example 1. 531 g. (91.4% of theory) of ethyltin tribromide were thereby obtained.

EXAMPLE 10

162.8 g. (0.5 mol) tributyltin chloride were added to 260.5 g. (1 mol) $SnCl_4$, 230 g. $POCl_3$ and 140 g. $P_2O_5$. The mixture was boiled using reflux, and then fractionated. 402 g. (94.7% of theory) of butyltin trichloride were obtained. Boiling point 45° C./1 torr. Found Cl=38.8%.

It could also be fractionated at a lower vacuum as for example 12 torrs, but somewhat smaller yields are obtained since at the higher boiling temperature (103°/12 torrs) some disproportionation products are formed.

I claim:
1. A process for the preparation of alkyltin trihalides by comproportionation of an alkyltin compound selected from dialkyltin dihalides, trialkyltin halides, and tin tetraalkyl compounds with tin tetrahalides in which the reaction is carried out in the presence of a member selected from the group consisting of phosphorus halogen compounds, phosphorus halogen compounds in admixture with phosphorus pentoxide, and hydrochloric acid which serves to increase the polarity of the reaction medium.
2. A process as claimed in claim 1 in which the phosphorus-halogen compound is phosphorus oxychloride.
3. A process as claimed in claim 1 in which when using a tin-tetraalkyl compound, the total quantity of reactants is reacted in one stage.
4. A process as claimed in claim 3 in which an excess of tin-tetrahalide is used.
5. A process as claimed in claim 1 in which when using tetraalkyl tin, or trialkyltin halide, a partial comproportionation is first carried out and the reaction is completed in a second reaction step.
6. A process as claimed in claim 1 in which the reaction is carried out under pressure.
7. A process as claimed in claim 1 in which the reaction is carried out above the boiling point of the reaction mixture.
8. A process as claimed in claim 1 wherein said alkyltin compound is a dialkyltin dihalide.
8. A process as claimed in claim 1 wherein said alkyltin compound is a trialkyltin halide.
10. A process as claimed in claim 1 wherein said alkyltin compound is a tin tetraalkyl compound.

References Cited

UNITED STATES PATENTS

| | | | |
|---|---|---|---|
| 3,248,411 | 4/1966 | Neumann et al. | 260—429.7 |
| 3,251,871 | 5/1966 | Dorfelt | 260—429.7 |
| 3,297,732 | 1/1967 | Banks | 260—429.7 |

FOREIGN PATENTS

| | | |
|---|---|---|
| 739,883 | 5/1954 | Great Britain. |

OTHER REFERENCES

Ferguson: Textbook of Organic Chemistry, 1958, p. 162.

TOBIAS E. LEVOW, Primary Examiner

W. F. W. BELLAMY, Assistant Examiner